United States Patent [19]

Stout

[11] 4,314,082
[45] Feb. 2, 1982

[54] DERIVATIVES OF 2-AMINO-6,7-DIHYDROXYTETRAHYDRO NAPHTHALENE (ADTN)

[75] Inventor: David M. Stout, Vernon Hills, Ill.

[73] Assignee: American Hospital Supply Corporation, Evanston, Ill.

[21] Appl. No.: 114,531

[22] Filed: Jan. 23, 1980

Related U.S. Application Data

[63] Continuation of Ser. No. 924,763, Jul. 14, 1978, abandoned.

[51] Int. Cl.³ .............................................. C07C 87/28
[52] U.S. Cl. .............................. 564/381; 260/501.18; 424/316; 424/330; 560/138; 560/142
[58] Field of Search .................. 260/570.8 R, 507.18; 564/374, 381

[56] References Cited

U.S. PATENT DOCUMENTS

| | | | |
|---|---|---|---|
| 2,900,415 | 8/1959 | Biel | 260/570.6 |
| 3,135,797 | 6/1964 | Biel | 260/570.6 |
| 3,579,582 | 5/1971 | Symon | 260/570.8 X |
| 3,930,022 | 12/1975 | Hauck et al. | 260/570.8 X |
| 4,163,063 | 7/1979 | Cannon et al. | 260/570.6 X |

FOREIGN PATENT DOCUMENTS 2373513 12/1977 France .............................. 564/381

OTHER PUBLICATIONS

McDermed et al. "Journal of Medical Chemistry" vol. 18, No. 4, pp. 362-367 (1975).
Woodruff et al. "Chemical Abstracts", vol. 82, p. 29, Section No. 132920c (1975).
Thrift, "Jour. Chem. Soc. London", Series C. pp. 288-293 (1967).
Burger, "Medicinal Chemistry", 2nd Ed. pp. 596-597 (1960).
Cannon et al. "Journal Medicinal Chemistry", vol. 20, pp. 1111-1116 (1977).

Primary Examiner—Robert V. Hines
Attorney, Agent, or Firm—Bernard, Rothwell & Brown

[57] ABSTRACT

This invention provides derivatives of 2-Amino-6,7-dihydroxy-tetrahydronaphthalene (ADTN) represented by the formula

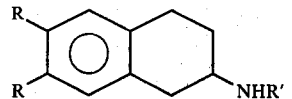

wherein R is OH, alkyloxy, hydroxyalkyl or acyloxy, and R' is an arylalkyl where the aryl group is benzyl, substituted benzyl, phenyl or substituted phenyl and the alkyl group is a straight or branched chain alkyl having one to twenty carbon atoms; and the pharmaceutically acceptable salts thereof.

These derivatives of 2-Amino-6,7-dihydroxytetrahydronaphthalene are useful as inotropes.

1 Claim, No Drawings

DERIVATIVES OF 2-AMINO-6,7-DIHYDROXYTETRAHYDRO NAPHTHALENE (ADTN)

This is a continuation of application Ser. No. 924,763 filed July 14, 1978, now abandoned.

DETAILED DESCRIPTION OF THE INVENTION

This invention relates to derivatives of 2-Amino-6,7-dihydroxytetrahydronaphthalene (ADTN) and more particularly, to N-arylalkyl derivatives of 2-Amino-6,7-dihydroxytetrahydronaphthalene (ADTN) characterized by formula (I)

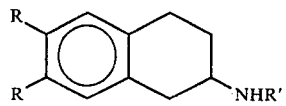

wherein R is OH, alkyloxy, hydroxyalkyl or acyloxy, and R' is an arylalkyl where the aryl group is benzyl, substituted benzyl, phenyl or substituted phenyl and the alkyl group is a straight or branched chain alkyl having one to twenty carbon atoms; and the pharmaceutically acceptable salts thereof.

The term "alkyloxy" as used herein refers to oxygenated straight or branched chain radicals containing one to ten carbon atoms, as illustrated by, but not limited to methoxy, ethoxy, butoxy and the like.

The term "hydroxyalkyl" as used herein refers to hydroxylated straight or branched chain radicals containing one to ten carbon atoms, as illustrated by, but not limited to 2-propanol, 3-propanol and the like.

The term "aryl" as used herein refers to benzyl, substituted benzyl, phenyl and substituted phenyl where the substituents of benzyl and phenyl include loweralkyl, hydroxy, alkoxy, acyloxy and the like.

The term "alkyl" refers to straight and branched chain alkyl radicals having from one to twenty carbon atoms such as methyl, n-amyl, 3-methyl-2-octyl, 2-nonyl and 2-tetradecyl.

The term "acyloxy" as used herein refers to acetoxy, propionyloxy, butyryloxy and the like.

The term "pharmaceutically acceptable salts" refers to acid addition salts prepared by reacting the basic amines of this invention with an organic or inorganic acid, or by reacting the amine salts with the salt of an appropriate acid. Representative salts which are so formed include the hydrochloride, hydrobromide, sulfate, bisulfate, acetate, oleate, laurate, benzoate, phosphate, citrate, maleate, succinate, tartrate and napsylate salts of the amines.

The present compounds, i.e., N-arylalkyl derivatives of 2-Amino-6,7 dihydroxytetrahydronaphthalene (ADTN), may be prepared by reductive aminations of the protected (ADTN) which may be prepared by a modification of the preparation reported by J. G. Cannon et al (*J. Med. Chem.*, 20, p. 1111 (1977)) and as illustrated in Scheme I below.

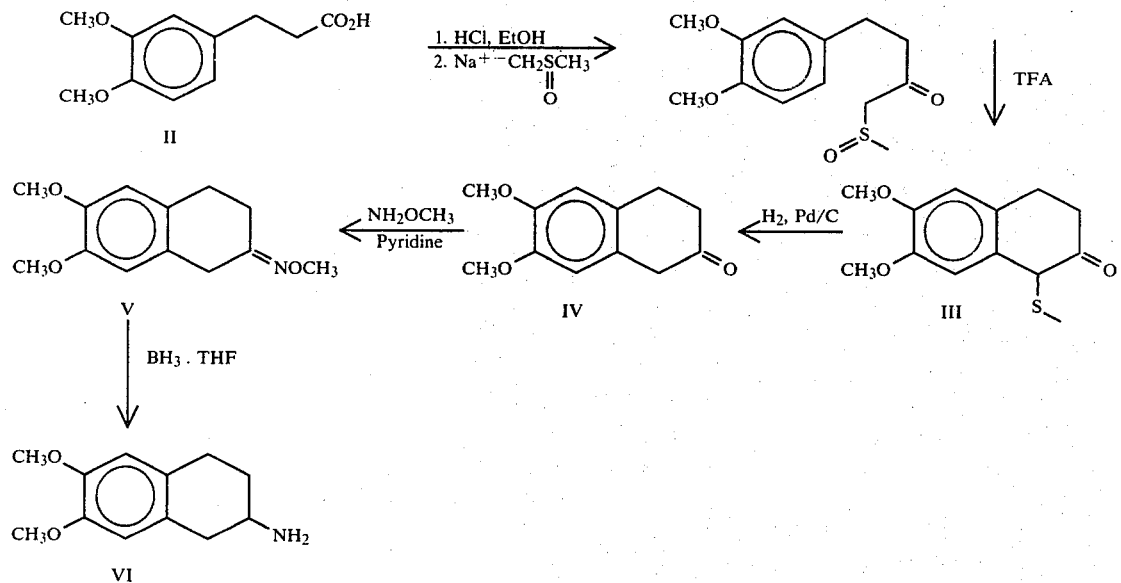

Scheme I

The preparation of the present derivatives by reductive aminations of the protected (ADTN) is carried out with the appropriate ketones and aldehydes.

Generally, in the preparation of the present derivatives, there is, initially, a solution of 2-Amino-6,7-dimethoxy-1,2,3,4-tetrahydronaphthalene (VI) in dry methanol is treated with the appropriate ketone or aldehyde and NaCNBH$_3$ under a nitrogen atmosphere. The mixture is then stirred for 72 hours whereupon concentrated HCl is added dropwise until the mixture becomes acidic. The methanol is removed on a rotary evaporator and the mixture is extracted with ether. The aqueous mixture is made basic to a pH greater than 12.0 with solid KOH and the mixture is extracted with ether. The combined extracts are dried (MgSO$_4$) and the solvent is removed on a rotary evaporator. The products are dissolved in CHCl$_3$ and hydrogen chloride is bubbled in and the solvent removed on a rotary evaporator. The products are crystallized in isopropanol and then isolated.

The compounds of the present invention that can be prepared by the reductive aminations of the protected (ADTN), and represented by formula (I) include:

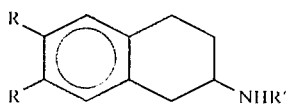
(I)

(a) 2(3-p-hydroxyphenyl-1-methylpropyl)amino-6,7-dihydroxy-1,2,3,4-tetrahydronaphthalene where R is OH and R' is represented by the formula

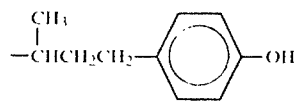

(b) 2-(3-p-hydroxyphenyl-1-methylpropyl)amino-6,7-dimethoxy-1,2,3,4-tetrahydronaphthalene where R is $OCH_3$ and R' is represented by the formula

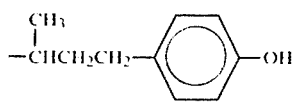

(c) 2-diacetoxy-α-methyl dopaminimino-6,7-diacetoxy-1,2,3,4-tetrahydronaphthalene where R is $CH_3CO-$ and R' is represented by the formula

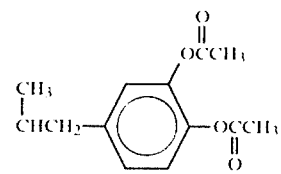

(d) 2-α-methyl dopaminimino-6,7-dihydroxy-1,2,3,4-tetrahydronaphthalene where R is OH and R' is represented by the formula

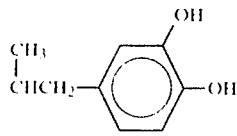

(e) 2-Dopaminimino-6,7-dihydroxy-1,2,3,4-tetrahydronaphthalene where R is OH and R' is represented by the formula

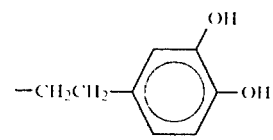

(f) 2-dimethoxy-α-methyl dopaminimino-6,7-dimethoxy-1,2,3,4-tetrahydronaphthalene where R is $OCH_3$ and R' is represented by the formula

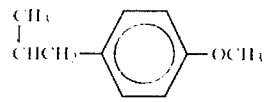

The compounds of the present invention exhibit inotropic activity in warm blooded animals at a dosage ranging from about 10.0 ug/kg to about 60.0 ug/kg of body weight daily.

The following examples will further illustrate the present invention.

EXAMPLE I

Preparation of 6,7-Dimethoxy-2-methoxyimino-1,2,3,4-Tetrahydronaphthalene (V)

A mixture of 0.56 g (6.7 mmol) of methoxylamine hydrochloride and 6.5 ml (6.5 mmol) of a 1 M aqueous solution of NaOH was added to 0.689 g (3.34 mmol) of 6,7-dimethoxy-2-tetralone (IV). While under a nitrogen atmosphere the mixture was warmed to ca. 100° for 15 minutes and then kept at 40° using an infrared lamp for 18 hours. Water was added to the mixture which was then extracted with ether. The combined extracts were dried ($MgSO_4$) and the solvent was removed on a rotary evaporator, affording 0.700 g (89.2%) of brown oil: nmr ($CDCl_3$) δ2.3–2.9 (m, 4H), 3.32 (S, 1H), 3.57 (S, 1H), 3.73 (S, 6H), 3.78 (S, 3H), 6.4–6.6 (m, 2H). The compound was used without further purification.

EXAMPLE II

Preparation of 2-Amino-6,7-dimethoxy-1,2,3,4-Tetrahydronaphthalene (VI)

2-Amino-6,7-dimethoxy-1,2,3,4-tetrahydronaphthalene (VI)

A solution of 0.700 g (2.98 mmol) of V in 20 ml of dry THF was treated with 5.0 ml (5.0 mmol) of a 1 M borane/THF solution while under a nitrogen atmosphere. The solution was heated to reflux for 6 hours and was then quenched with water. The aqueous mixture was extracted with $CHCl_3$, the combined extracts were dried and hydrogen chloride was bubbled into the solution. The solvent was removed on a rotary evaporator, leaving 0.775 g of off-white solid. Crystallization from isopropanol afforded 0.469 g (64.8%) of off-white product: mp. 83°–86° C. (lit. 85°–87° C.).

EXAMPLE III

Preparation of ADTN Derivatives by Reductive Amination of Protected ADTN

In the preparation of the derivatives, the general procedure was as follows: A solution of 1 mmol of VI in 2 ml of dry methanol was treated with 1 mmol of the appropriate ketone or aldehyde and 1.05 mmol of $NaCNBH_3$ under a nitrogen atmosphere. The mixture was stirred for 72 hours whereupon concentrated HCl was added dropwise until the mixture became acidic. The methanol was removed on a rotary evaporator, the mixture was extracted with ether. The aqueous mixture was made basic (pH>12) with solid KOH and the mixture was extracted with ether. The combined extracts were dried ($MgSO_4$) and the solvent was removed on a rotary evaporator. The products were dissolved in $CHCl_3$, hydrogen chloride was bubbled in and the solvent was removed on a rotary evaporator. Crystallization of the products was carried out in isopropanol and the compounds were isolated. The compounds produced and the date of their preparation are as follows:

(a) 2-(3-p-hydroxyphenyl-1-methylpropyl)amino-6,7-dihydroxy-1,2,3,4-tetrahydronaphthalene: The compound was isolated in 43% yield: mp. 236°–237° C., nmr (CD$_3$OD) $\delta$1.3–1.7 (m, 3H), 1.7–3.8 (m, 12H), 6.43 (S, 2H), 6.65 (d, J=7 Hz, 2H), 7.00 (d, J=7 Hz, 2H).

Calcd for C$_{20}$H$_{26}$NO$_3$Br; C, 58.63; H, 6.42; N, 3.43. Found: C, 58.54; H, 6.39; N, 3.37.

(b) 2-(3-p-hydroxyphenyl-1-methylpropyl)amino-6,7-dimethoxy-1,2,3,4-tetrahydronaphthalene: The compound was isolated in 91% yield: mp. 230°–232° C. (d); nmr (CDCl$_3$) $\delta$1.13 (d, J=6 Hz, 3H), 1.3–2.2 (m, 4H), 2.2–3.2 (m, 8H), 3.73 (S, 6H), 4.82 (S, 2H), 6.47 (m, 2H), 6.75 (m, 4H, J=8 Hz).

Calcd for C$_{22}$H$_{30}$NO$_3$Cl: C, 67.41; H, 7.46; N, 3.57. Found: C, 67.18; H, 7.72; N, 3.46.

(c) 2-diacetoxy-$\alpha$-methyl dopaminimino-6,7-diacetoxy-1,2,3,4-tetrahydronaphthalene: A solution of 0.200 g of 2-$\alpha$-methyl dopaminimino-6,7-dihydroxy-1,2,3,4-tetrahydronaphthalene (d) in 1 ml of trifluoroacetic acid and 1 ml of acetyl chloride was warmed to ca. 80° for 0.5 h. The solvent was evaporated and crystallization of the solid from ethanol afforded 0.140 g (50.4%) of product: mp. 192°–194° C.; nmr (CD$_3$OD) $\delta$1.15 (d, J=6 Hz, 3H), 2.10 (S, 12H), 2.6–3.9 (m, 10H), 6.8–6.9 (m, 2H), $\delta$0.03 (S, 3H).

Calcd for C$_{27}$H$_{32}$NO$_8$Br: C, 56.06; H, 5.58; N, 2.42. Found: C, 56.19; H, 5.40; N, 2.26.

(d) 2-$\alpha$-methyl dopaminimino-6,7-dihydroxy-1,2,3,4-tetrahydronaphthalene: The compound was isolated in 57% yield; nmr (CD$_3$OD) $\delta$ (1.32, d, J=6 Hz, 3H), 1.5–4.0 (m, 10H), 6.4–6.8 (m, 5H).

(e) 2-dimethoxy-$\alpha$-methyl dopaminimino-6,7-dimethoxy-1,2,3,4-tetrahydronaphthalene: The compound was isolated in 35% yield; m.p. 224°–229° C.; ir (KBr) 3480, 3020–2650, 1612, 1590 cm$^{-1}$.

EXAMPLE IV

Inotropic, Chronotropic and Pressor/Depressor Activities

The following tests were conducted:

In anesthetized, open-chested dogs, instrumented with a Walton-Brodie strain gauge to measure cardiac contractile force, a ventricular catheter to measure left ventricular dP/dt and an aortic catheter to measure diastolic blood pressure and heart rate. Contractile force and L.V. dP/dt are indices of cardiac contractility and provide information on the inotropic state of the heart. The experimental standard drugs are compared by normalizing pressor/depressor and heart rate responses to a given inotropic effect. Cardioselective inotropic agents will produce minimal diastolic pressure changes for any given inotropic effect. Likewise, inotropic selective agents will produce minimal heart rate changes for any given inotropic effect.

In the data summary below, compounds A–F are:

| Compound | Name |
| --- | --- |
| A | 2-(3-p-hydroxyphenyl-1-methylpropyl) amino-6,7-dimethoxy-1,2,3,4-tetrahydronaphthalene |
| B | 2-(3-p-hydroxyphenyl-1-methylpropyl) amino-6,7-dihydroxy-1,2,3,4-tetrahydronaphthalene |
| C | 2-amino-6,7 dihydroxy-1,2,3,4-tetrahydronaphthalene |
| D | (+)-4-(2(3-p-hydroxyphenyl-1-methylpropyl) amino) ethyl-1,2,benzenediol (Dobutamine (R): Lilly) |
| E | 4-(2-aminoethyl)-1,2-benzenediol (Dopamine) |
| F | 4-(1-hydroxy-2-((1-methylethyl)-amino) ethyl)-1,2-benzenediol (Isoproterenol) |

Inotropic Potency*
(means ± SEM)

| Compound | N | CF$_{50}$ | CF$_{100}$ | dP/dt$_{75}$ | dP/dt$_{150}$ |
| --- | --- | --- | --- | --- | --- |
| A | 1 | 157.6 | 333.1 | 261.8 | 756.0 |
| B | 2 | 56.3 | 197.6 | 125.4 | 358.6 |
| C | 5 | 44.9 ± 3.3 | 118.8 ± 34.7 | 40.4 ± 3.1 | 75.6 ± 5.8 |
| D | 6 | 1.4 ± 0.2 | 4.4 ± 0.8 | 1.4 ± 0.2 | 4.0 ± 0.6 |
| E | 6 | 9.1 ± 1.0 | 19.6 ± 2.7 | 9.9 ± 0.7 | 23.7 ± 3.0 |
| F | 6 | 0.04 ± 0.01 | 0.09 ± 0.02 | 0.04 ± 0.01 | 0.14 ± 0.05 |

*ng/kg required to produce 50 and 100% increase in cardiac contractile force (CF) and 75 and 150% increase in left ventricular dP/dt (dP/dt).

Cardioselectivity*
(means ± SEM)

| Compound | N | CF$_{50}$ | CF$_{100}$ | dP/dt$_{75}$ | dP/dt$_{150}$ |
| --- | --- | --- | --- | --- | --- |
| A | 1 | 17 | 27 | 23 | 40 |
| B | 2 | 13 | 57 | 37 | 75 |
| C | 5 | 31 ± 9 | 61 ± 10 | 30 ± 5 | 51 ± 5 |
| D | 6 | 3 ± 1 | 4 ± 3 | 4 ± 1 | 3 ± 3 |
| E | 6 | 20 ± 6 | 12 ± 9 | 20 ± 7 | 10 ± 8 |
| F | 6 | 6 ± 2 | 15 ± 2 | 6 ± 2 | 16 ± 2 |

*Change in diastolic blood pressure obtained at CF$_{50}$, CF$_{100}$, dP/dt$_{75}$, dP/dt$_{150}$ (mm Hg).

Inotropic Selectivity*
(means ± SEM)

| Compound | N | CF$_{50}$ | CF$_{100}$ | dP/dt$_{75}$ | dP/dt$_{150}$ |
| --- | --- | --- | --- | --- | --- |
| A | 1 | 5 | 14 | 10 | 27 |
| B | 2 | 17 | 15 | 0 | 32 |
| C | 5 | 12 ± 9 | 21 ± 17 | 12 ± 10 | 5 ± 8 |
| D | 6 | 3 ± 1 | 17 ± 5 | 3 ± 1 | 13 ± 2 |
| E | 6 | 5 ± 5 | 12 ± 5 | 5 ± 6 | 13 ± 6 |
| F | 6 | 14 ± 2 | 34 ± 3 | 14 ± 1 | 41 ± 5 |

*Change in heart rate obtained at CF$_{50}$, CF$_{100}$, dP/dt$_{75}$, dP/dt$_{150}$ (BPM).

We claim:
1. A compound of the formula

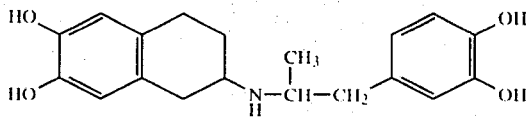

or a pharmaceutically acceptable salt thereof.

* * * * *